April 27, 1937.    B. O. AUSTIN ET AL    2,078,216
MOTOR CONTROL SYSTEM
Filed Jan. 2, 1935
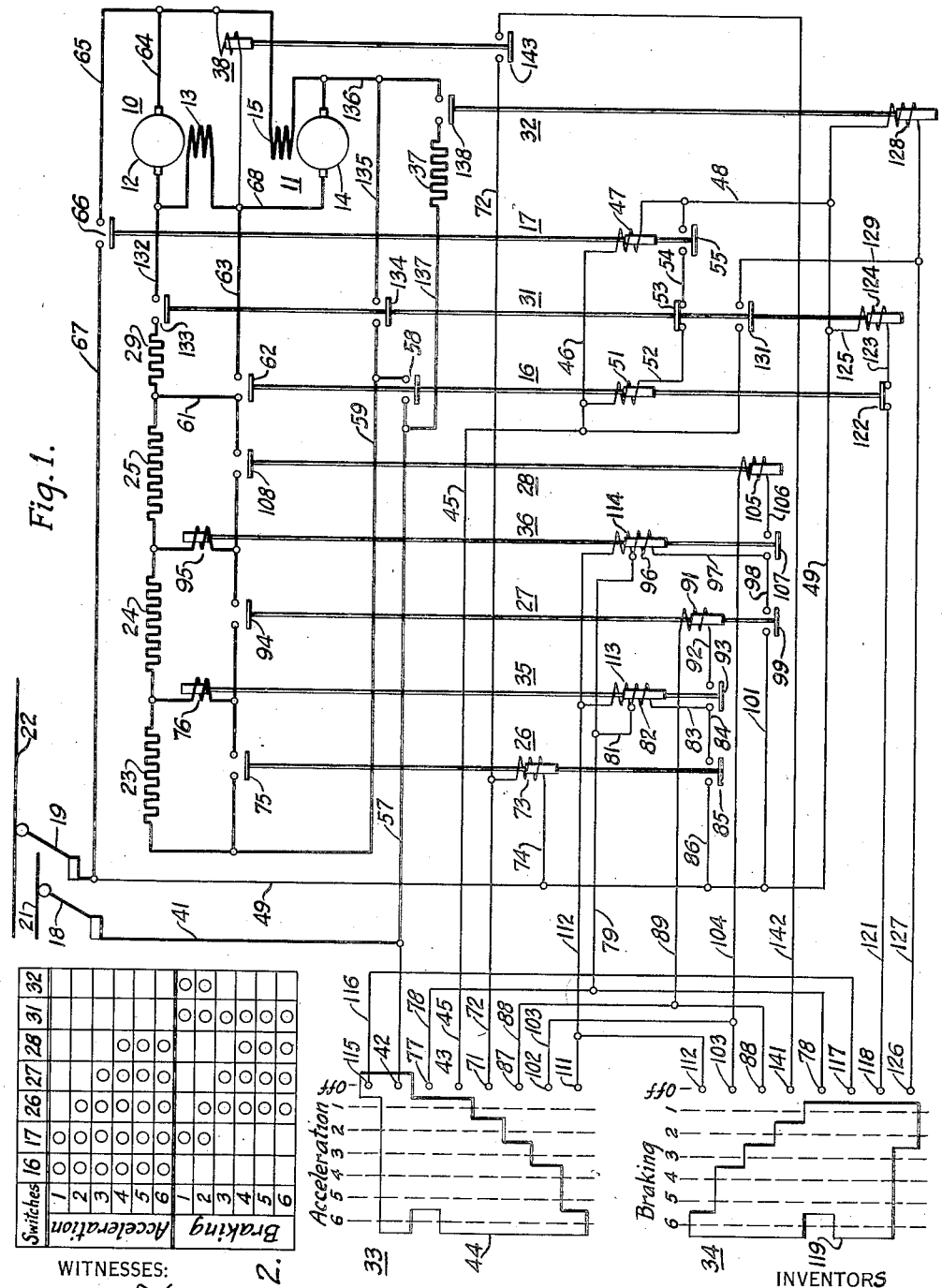
INVENTORS
Bascum O. Austin and
Norman H. Willby.

Patented Apr. 27, 1937

2,078,216

UNITED STATES PATENT OFFICE 2,078,216

MOTOR CONTROL SYSTEM

Bascum O. Austin, Forest Hills, and Norman H. Willby, Irwin, Pa., assignors to Westinghouse Electric & Manufacturing Company, East Pittsburgh, Pa., a corporation of Pennsylvania Application January 2, 1935, Serial No. 68

7 Claims. (Cl. 172—288)

Our invention relates, generally, to motor control systems, and, more particularly, to systems for controlling the operation of the propelling motors of electric vehicles, such as street cars and trackless-trolley coaches.

An object of our invention, generally stated, is to provide a motor control system which shall be simple and efficient in operation, and which may be economically manufactured and installed.

A more specific object of our invention is to provide an automatic accelerating system in which the shunting of more than one step of resistance at a time during the automatic progression of the control system is definitely prevented.

Another object of our invention is to provide an automatic accelerating system having variable rates of acceleration for the propelling motors of an electric vehicle.

Still another object of our invention is to provide a motor control system in which step-by-step acceleration can be obtained as well as automatic acceleration of the motors.

A still further object of our invention is to prevent the progression of an automatic control system during dynamic braking of the motors until the motor voltage has attained a predetermined value.

Other objects of our invention will be explained fully hereinafter or will be apparent to those skilled in the art.

In accordance with one embodiment of our invention, the progression of an automatic control system is governed by a plurality of limit relays, one of which may be provided for each step of the control system. The limit relays are so connected in the system that they are successively energized as the accelerating switches are closed and each switch in the progression cannot close until the motor current is of such a value that its respective limit relay operates to energize the switch. During dynamic braking, the same resistors and switches are utilized to control the motor current as during acceleration, but the automatic progression is prevented from starting until the motor voltage has built up to a predetermined value. Variable rates of acceleration and braking are obtained by providing actuating coils on the limit relays having a plurality of taps which are governed by the master controller.

For a fuller understanding of the nature and objects of our invention, reference may be had to the following detailed description, taken in conjunction with the accompanying drawing, in which:

Figure 1 is a diagrammatic view of a motor control system embodying our invention; and Fig. 2 is a chart showing the sequence of operation of certain of the switches illustrated in Fig. 1.

Referring now to the drawing, the system shown comprises a pair of electric motors 10 and 11, which may be of any type suitable for propelling a trolley bus or other electrically-propelled vehicle. The motors shown are of the series type, the motor 10 having an armature winding 12 and a series field winding 13, and the motor 11 having an armature winding 14 and a series field winding 15. Electrically operated switches 16 and 17 are provided for connecting the motors 10 and 11 to current collecting devices 18 and 19, which engage overhead power conductors 21 and 22, respectively. A plurality of resistors 23, 24 and 25 are provided for controlling the motor current during the acceleration of the motors and electrically operated switches 26, 27 and 28 are provided for shunting the resistors 23, 24 and 25, respectively. In addition to the foregoing resistors, a resistor 29 is utilized during dynamic braking of the motors to control the motor current, and electrically operated switches 31 and 32 are provided for establishing the dynamic braking connections for the motors. A master controller 33, which may be of the drum type, is provided for controlling the motors while they are propelling the vehicle and a similar controller 34 is utilized during dynamic braking. The two controllers are so electrically interlocked that it is necessary for the accelerating controller 33 to be in the "off" position before the controller 34 can be effective in establishing the braking connections.

In order that the acceleration, and also the dynamic braking of the vehicle, may be automatically controlled, as well as manually by means of the controllers 33 and 34, current limit relays 35 and 36 are provided for automatically controlling the operation of the resistor shunting or accelerating switches 27 and 28 as will be more fully described hereinafter.

With a view to preventing the skipping of notches or steps and to ensuring that the motor current has dropped to the proper value before additional resistance is shunted from the motor circuit, a limit relay is provided for each step in the automatic progression and each limit relay controls only one of the accelerating switches, instead of one limit relay controlling all of the switches, as in previously known systems. The limit relays are so connected in the motor circuit that they are successively energized by the motor current as each step of resistance is shunted from the motor circuit by the accelerating switches. The next switch in the progression cannot operate until permitted to do so by the limit relay that was energized by the closing of the preceding switch.

As shown, each current limit relay is provided with two coils which are disposed on the relay in opposed relation. In this instance a series coil pulls down on the relay armature and a shunt coil pulls up. When neither coil is energized, the relay is actuated by gravity to its lowermost position, in which position the contact members of the relay are open and they can be closed only by the shunt coil raising the relay armature. Since the series coil is energized by the motor current in the foregoing manner and the shunt coil is energized by the trolley potential, it will be seen that the relay cannot close until the motor current falls to a value which will permit the shunt coil to overcome the series coil. Thus, the next switch in the progression cannot operate until the motor current has dropped to a predetermined value. In order that variable rates of acceleration, and also dynamic braking, may be obtained, the shunt coils on the limit relays may be provided with one or more taps, the connections to which are controlled by the master controller. In this manner, the maximum rate of acceleration may be obtained by energizing the entire shunt coil windings, or a lower rate may be obtained by energizing only a portion of the windings through their respective taps.

In order to insure that the voltage of the machines 10 and 11 will build up quickly when dynamic braking connections are established, the field winding 15 of the motor 11 is connected to the power source through a resistor 37 during the first part of the braking cycle. After the voltage of the machines has once built up, it is no longer necessary to separately excite the field winding of the one machine.

With a view to preventing the resistor shunting switches from being automatically operated before the voltage of the machines 10 and 11 has built up, when the dynamic braking connections are established, a relay 38 is connected across the machines 10 and 11 to be responsive to the voltage of the machines. The contact members of the relay 38 are so connected in the control system that the operation of the resistor shunting switches cannot take place until the voltage of the machines 10 and 11 has been built up to a predetermined value. However, the relay 38 is effective only during dynamic braking and not during acceleration of the motors.

With a view to simplifying the drawing and the description of the control system, only a few steps of resistance have been shown in the motor circuit. It will be understood that additional resistors, accelerating switches and limit relays may be readily provided, if desired.

In order that the functioning of the foregoing apparatus may be more clearly understood, the operation of the system will now be described. Assuming that it is desired to accelerate the vehicle under manual control of the operator, the master controller 33 may be actuated to position 1, thereby energizing the actuating coils of the line switches 16 and 17, which causes the motors 10 and 11 to be connected to the current collectors 18 and 19. The energizing circuit for the coil of the line switch 17 may be traced from the positive power conductor 21 through the current collector 18, conductor 41, contact fingers 42 and 43, bridged by a contact segment 44 on the controller 33, conductors 45 and 46, the actuating coil 47 on the line switch 17, conductors 48 and 49, and the current collector 19 to the negative power conductor 22. The circuit through the actuating coil of the line switch 16 extends from the previously energized conductor 46 through the actuating coil 51, conductor 52, an interlock 53 on the switch 31, conductor 54, an interlock 55 on the switch 17 and conductor 48 to the negative conductor 49.

The motors 10 and 11 are now connected to the power source in parallel-circuit relation. The circuit through the motor 10 may be traced from the positive conductor 21 through the current collector 18, conductors 41 and 57, contact members 58 on the switch 16, conductor 59, the resistors 23, 24 and 25, conductor 61, contact members 62 on the switch 16, conductor 63, the field winding 13 and armature winding 12 of the motor 10, conductors 64 and 65, contact members 66 on the switch 17, conductor 67 and the current collector 19 to the negative conductor 22. The circuit through the motor 11 extends from the previously energized conductor 63 through conductor 68, the armature winding 14 and the field winding 15 of the motor 11 to the conductor 65, and thence through the circuit previously traced to the negative conductor 22.

Since the motors 10 and 11 are connected in series with the resistors 23, 24 and 25, they will rotate at a low speed. The motors may be accelerated in a manner well known in the art by moving the controller 33 to position 2, thereby closing the accelerating switch 26 to shunt the resistor 23 from the motor circuit. The energizing circuit for the actuating coil of the switch 26 may be traced from a contact finger 71, which engages the segment 44, conductor 72, the actuating coil 73 on the switch 26, and conductor 74 to the negative conductor 49. When the switch 26 is actuated to its uppermost position, the contact members 75 are closed to shunt the resistor 23 from the motor circuit.

It will be noted that the series coil 76 of the limit relay 35 is connected in the motor circuit when the resistor shunting switch 26 is closed. Therefore, the series coil 76 is energized by the motor current. The operation of the switch 26 also completes the energizing circuit for a portion of the winding of the shunt coil of the limit relay 35. The energizing circuit for the shunt coil may be traced from a contact finger 77, which engages the segment 44 on the controller 33, conductors 78, 79 and 81, the lower portion 82 of the winding of the shunt coil on the relay 35, conductors 83 and 84, an interlock 85 on the switch 26, and conductor 86 to the negative conductor 49.

As explained hereinbefore, the limit relay 35 will be raised to its uppermost position when the motor current is reduced to a value which will permit the shunt winding 82 on the limit relay to overcome the force exerted by the series windings 76, thereby permitting the next step of acceleration to be taken.

Assuming that the limit relay 35 is raised to its uppermost position, the actuating coil of the switch 27 may be energized to close this switch by moving the controller 33 to position 3. The energizing circuit for the actuating coil of the switch 27 may be traced from a contact finger 87 through conductors 88 and 89, the coil 91 on the switch 27, conductor 92, contact members 93 on the limit relay 35, conductor 84, the interlock 85 on the switch 26, and conductor 86 to the negative conductor 49. In this manner, the contact members 94 of the switch 27 are closed to shunt the resistor 24 from the motor circuit, thereby completing the second step in the acceleration of the motors 10 and 11.

The limit relay 36 functions in a manner similar to the relay 35 to prevent the next step of acceleration from being taken until the motor current is reduced to a predetermined value. The series coil 95 is energized by the motor current when the contact members 94 of the switch 27 are closed and a portion of the shunt winding is also energized at that time. The circuit through the shunt winding may be traced from the previously energized conductor 79, through the lower portion 96 of the shunt winding on the relay 36, conductors 97 and 98, an interlock 99 on the switch 27 and conductor 101 to the negative conductor 49.

Accordingly when the motor current is reduced to the value which will permit the shunt coil of the relay 36 to overcome the series coil 95 and raise the relay to its uppermost position, the switch 28 may be closed by actuating the controller 33 to position 4. The energizing circuit for the actuating coil of the switch 28 may be traced from a contact finger 102, which engages the contact segment 44, conductors 103 and 104, the actuating coil 105, conductor 106, contact members 107, on the limit relay 36, conductor 98, an interlock 99 on the switch 27 and conductor 101 to the negative conductor 49. In this manner, the contact members 108 of the switch 28 are closed to shunt the resistor 25 from the motor circuit, thereby applying maximum voltage to the motors 10 and 11.

If it is desired to accelerate the motors by automatic control, instead of by manual control, as just described, the master controller 33 may be initially actuated to position 5 instead of in the step-by-step manner previously described. By actuating the controller 33 to position 5, the motors 10 and 11 will first be connected to the power source in series with the resistors 23, 24 and 25, and these resistors then shunted from the motor circuit by automatic progression under the control of the limit relays 35 and 36 in the manner herein described, it being necessary for the motor current to be reduced to a predetermined value after the first step in the accelerating progression is taken before the next step can be taken.

If it is desired to accelerate the motors at a higher rate of acceleration, the master controller 33 may be initially actuated to position 6, thereby energizing the entire shunt windings on each of the relays 35 and 36 and deenergizing the contact finger 77, which will increase the force exerted by the shunt windings and cause the limit relays to be raised to their uppermost positions at a higher value of motor current. The circuit through the shunt windings of the limit relay 35 may be traced from a contact finger 111, which engages the segments 44 on the controller 33, through conductor 112, the portions 113 and 82 of the shunt winding on the relay 35, and thence through a circuit previously traced to the negative conductor 49. The circuit through the shunt winding on the relay 36 extends from the previously energized conductor 112 through the windings 114 and 96 on the relay 36, and thence through a circuit previously traced to the negative conductor 49.

It will thus be seen that the motors 10 and 11 may be accelerated either by manual control in a step-by-step manner, or by automatic progression under the control of the limit relays 35 and 36, which are so connected in the motor circuit that only one step of acceleration can be taken at a time, and that the motor current must be reduced to a predetermined value before the next step in the automatic progression can be taken.

If it is desired to retard the movement of the vehicle by dynamic braking, the accelerating controller 33 must first be returned to the "off" position, and then the braking controller 34 may be advanced step-by-step to produce the desired braking effect. By returning the accelerating controller 33 to the "off" position, the motors 10 and 11 are disconnected from the power source, as the line switches 16 and 17 are deenergized. Control energy is also supplied to the braking controller 34 through a circuit which extends from contact fingers 42 and 115, bridged by the segment 44 and conductor 116, to a contact finger 117 on the controller 34.

Dynamic braking connections may then be established for the motors 10 and 11 by actuating the controller 34 to position 1 to operate the switches 31, 32 and 17. The circuit through the actuating coil of the switch 31 may be traced from a contact finger 118, which engages a segment 119 on the controller 34, through conductor 121, an interlock 122 on the switch 16, conductor 123, the actuating coil 124 on the switch 31, and conductor 125 to the negative conductor 49. The circuit for the coil of the switch 32 may be traced from the contact finger 126 on the controller 34 through conductor 127 and the actuating coil 128 of the switch 32 to the negative conductor 49. The circuit for the coil of the switch 17 extends from the previously energized conductor 127 through conductor 129, an interlock 131 on the switch 31, conductors 45 and 46, the actuating coil 47 on the switch 17 and conductor 48 to the negative conductor 49.

The closing of the switches 31, 32 and 17 establishes dynamic braking connections for the motors 10 and 11, the motors being so connected that the current in the armature windings of the motors is reversed and the field winding of each motor is excited by the armature current of the other motor. The one dynamic braking circuit may be traced from one terminal of the armature 12 of the motor 10, through conductor 132, contact members 133 on the switch 31, the resistors 29, 25, 24 and 23, conductor 59, contact members 134 on the switch 31, conductors 135 and 136, the field winding 15 of the motor 11, conductors 65 and 64 to the other terminal of the armature 12. The other dynamic braking circuit may be traced from the one terminal of the armature 14 of the motor 11 through conductor 68, the field winding 13 of the motor 10, conductor 132, contact members 133, resistors 29, 25, 24 and 23, conductor 59, contact members 134 and conductors 135 and 136 to the other terminal of the armature 14. By connecting the motors in this manner they are caused to function as generators, thereby retarding the movement of the vehicle.

As stated hereinbefore, provision is made for separately exciting the field winding 15 of the motor 11 from the power source when the dynamic braking connections are first established, thereby insuring that the voltage of the machines 10 and 11 will build up quickly and dynamic braking take effect immediately. The circuit providing separate excitation for the field winding 15 may be traced from the power conductor 21, through the current collector 18, conductors 41, 57 and 137, resistor 37, contact members 138 on the switch 32, conductor 136, the field winding 15, conductor 65, the contact members 66 on the switch 17, conductor 67 and the current collector 19 to the negative power conductor 22. By separately exciting the field winding 15, it is insured that the motor 11 will immediately start generating current, thereby providing excitation for the field winding 13 of the motor 10, which will also function as a generator.

The current generated by the machines 10 and 11, and therefore, the braking effect of these machines may be controlled by means of the resistors 23, 24 and 25 and their respective shunting switches, 26, 27 and 28, in a manner similar to that utilized during the acceleration of the motors 10 and 11, by closing the switches 26, 27 and 28 in sequential relation to shunt the resistors 23, 24 and 25 from the motor circuit.

However, as explained hereinbefore, the closing of the switch 26 which is the first one in the progression, cannot take effect until the voltage of the machines 10 and 11 has built up to a predetermined value to operate the relay 38, which controls the energization of the actuating coil of the switch 26. Assuming that the voltage of the machines 10 and 11 has reached a value which will cause the relay 38 to close its contact members, the switch 26 may be operated to shunt the resistor 23, by actuating the controller 34 to position 2, thereby energizing the actuating coil of the switch 26. The circuit through the coil of this switch may be traced from a contact finger 141, which engages the segment 119, through conductor 142, the contact members 143 on the relay 38, conductor 72, the actuating coil 73 of the switch 26 and conductor 74 to the negative conductor 49.

The switches 27 and 28 may be closed in sequential relation by either actuating the controller 34 to positions 3 and 4 in a step-by-step manner, under manual control of the operator, or by actuating the controller 34 to position 5, which will cause the switches 27 and 28 to be automatically closed under the control of the limit relays 35 and 36 in the same manner as during the acceleration of the motors 10 and 11. In either event, the switch 27 cannot be closed until the motor current has been reduced to a value which will permit the limit relay 35 to be operated to close its contact members after the switch 26 has been closed, and the switch 28 cannot be operated until the limit relay 36 has closed its contact members after the switch 27 has been closed.

In this manner, the rate of deceleration of the vehicle by dynamic braking is controlled by the limit relays 35 and 36 in the same manner as the rate of acceleration is controlled. If the maximum rate of deceleration is desired, the controller 34 may be actuated to position 6, thereby energizing the entire shunt windings on the limit relays 35 and 36 and deenergizing the contact finger 78, which will cause the relays to operate at a higher value of motor current, as explained hereinbefore.

Since it is not necessary to provide separate excitation for the field winding 15 of the motor 11 after the voltage of the motors 10 and 11 has been built up, the switches 32 and 17 are permitted to open when the controller 34 is actuated to position 3, thereby interrupting the exciting circuit after the dynamic braking is established. The resistor 29 is not shunted from the motor circuit during dynamic braking, in order that the dynamic braking effect will be gradually reduced as the speed of the vehicle is decreased.

From the foregoing description, it is apparent that we have provided a control system which is both simple and flexible in operation, since it is possible to obtain step-by-step acceleration under the control of a vehicle operator or automatic acceleration at variable rates. By providing a separate limit relay for each step of acceleration, each notch is definitely tested, to make sure that the motor current has dropped to the proper value, before the next step in the progression can be taken, thereby preventing overloading of the motors. Skipping of notches during automatic acceleration is definitely prevented by the action of the limit relays. Furthermore, the progression is obtained in a definite sequence since it is impossible to operate any one of the accelerating switches until the preceding switches have been operated.

We do not desire to be restricted to the specific embodiment of the invention herein shown and described, since it is evident that it may be changed and modified without departing from the spirit and scope of the invention, as defined in the appended claims.

We claim as our invention:

1. In a motor control system, in combination, a motor, a source of power for the motor, switching means for connecting the motor to the power source, a controller for controlling the operation of said switching means, a plurality of resistors for controlling the motor current, a plurality of switches for shunting the resistors step-by-step, a plurality of current limit relays cooperating with the controller to control the operation of said resistor shunting switches, each of said relays having a coil energized by the motor current in sequential relation as the resistor shunting switches are operated, and means on said relays associated with said controller for changing the operating characteristics of the relays.

2. In a motor control system, in combination, a motor, a source of power for the motor, switching means for connecting the motor to the power source, a controller for controlling the operation of said switching means, a plurality of resistors for controlling the motor current, a plurality of switches for shunting the resistors step-by-step, and a plurality of current limit relays cooperating with the controller to control the operation of said resistor shunting switches, each of said relays having a series coil energized by the motor current and a shunt coil energized from the source of power as the resistor shunting switches are operated in sequential relation.

3. In a motor control system, in combination, a motor, a source of power for the motor, switching means for connecting the motor to the power source, a controller for controlling the operation of said switching means, a plurality of resistors for controlling the motor current, a plurality of switches for shunting the resistors in sequential relation, the first one of said switches being controlled by the controller, limit relays responsive to the motor current and cooperating with the controller to control the remaining switches, each limit relay controlling only one of said switches, and means on said relays associated with said controller for changing the operating characteristics of the relays.

4. In a motor control system, in combination, a motor, a source of power for the motor, switching means for connecting the motor to the power source, a controller for controlling the operation of said switching means, a plurality of resistors for controlling the motor current, a plurality of switches for shunting the resistors in sequential relation, a plurality of current limit relays responsive to the motor current and cooperating with the controller to control the operation of the resistor shunting switches, interlocking means on said switches for controlling the energization of the current limit relays, and means on said relays energized through said controller for governing their operation.

5. In a motor control system, in combination, a motor, a source of power for the motor, switching means for connecting the motor to the power source, a controller for controlling the operation of said switching means, a plurality of resistors for controlling the motor current, a plurality of switches for shunting the resistors in sequential relation, a plurality of current limit relays cooperating with the controller to control the operation of the resistor shunting switches, each of said relays having a series coil energized by the motor current and a separately energized shunt coil, and means operated by the resistor shunting switches for controlling the energization of the series coils and the shunt coils on the limit relays.

6. In a motor control system, in combination, a motor, a source of power for the motor, switching means for connecting the motor to the power source, a controller for controlling the operation of said switching means, a plurality of resistors for controlling the motor current, a plurality of switches for shunting the resistors in sequential relation, and a plurality of current limit relays cooperating with the controller to control the operation of the resistor shunting switches, each of said relays having a series coil energized by the motor current and a separately energized shunt coil provided with a plurality of taps and disposed to oppose the series coil.

7. In a motor control system, in combination, a motor, a source of power for the motor, switching means for connecting the motor to the power source, a controller for controlling the operation of said switching means, a plurality of resistors for controlling the motor current, a plurality of switches for shunting the resistors in sequential relation, and a plurality of current limit relays cooperating with the controller to control the operation of the resistor shunting switches, each of said relays having a series coil energized by the motor current and a separately energized shunt coil provided with a plurality of taps and disposed to oppose the series coil, and means on the controller for governing the energization of the shunt coils to vary the rate of acceleration of the motors.

BASCUM O. AUSTIN.
NORMAN H. WILLBY.